Jan. 4, 1938. R. S. GAUGLER 2,104,587
REFRIGERATING APPARATUS
Filed March 30, 1935 3 Sheets-Sheet 1

INVENTOR.
Richard S. Gaugler
BY
Spencer Hardman and Fehr
ATTORNEYS

Jan. 4, 1938.     R. S. GAUGLER     2,104,587
REFRIGERATING APPARATUS
Filed March 30, 1935     3 Sheets-Sheet 2

Jan. 4, 1938.   R. S. GAUGLER   2,104,587
REFRIGERATING APPARATUS
Filed March 30, 1935   3 Sheets-Sheet 3
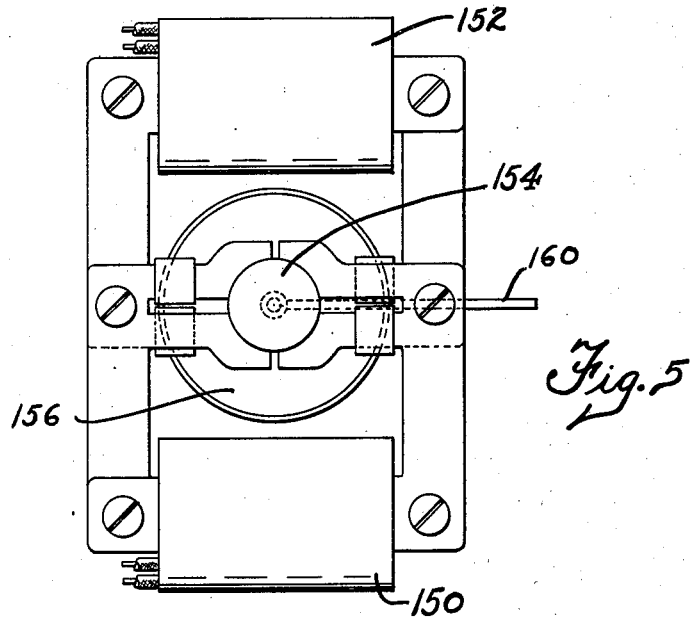
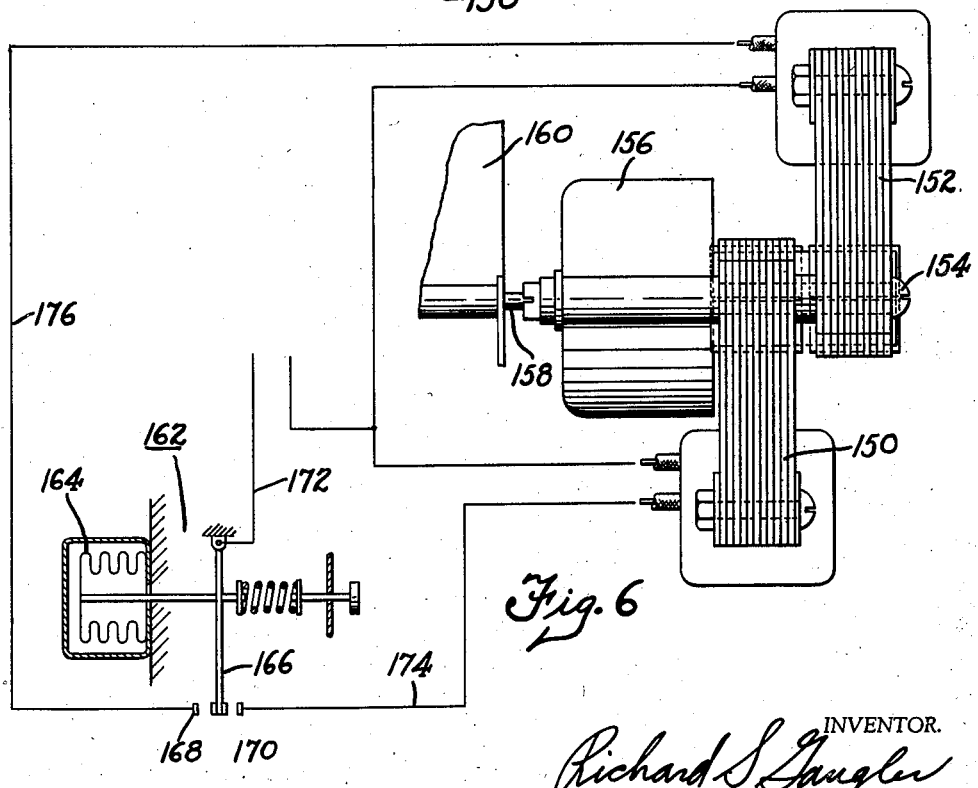
INVENTOR.
Richard S. Gaugler
BY
Spencer Hardman and John
ATTORNEYS Patented Jan. 4, 1938

2,104,587

UNITED STATES PATENT OFFICE 2,104,587

REFRIGERATING APPARATUS

Richard S. Gaugler, Dayton, Ohio, assignor to General Motors Corporation, Dayton, Ohio, a corporation of Delaware Application March 30, 1935, Serial No. 13,831

4 Claims. (Cl. 257—3)

This invention relates to refrigerating apparatus and more particularly to air conditioning means and controls therefor.

For certain types of air conditioning air at a predetermined temperature is desired. This is conveniently done by providing a source of cool air and a source of warm air and mixing the cool air and the warm air in proper proportions. Automatic controls are available for controlling this mixing of the air but these controls are designed for large installations and are extremely expensive for small installations such as cooling individual rooms or beds.

It is an object of my invention to provide an air conditioning system with a simple sensitive inexpensive automatic control for the mixing of air automatically in proper proportions to secure the desired condition of the air.

It is a further object of my invention to provide an air conditioning system with an automatic control which will move a damper at a timed speed to any position required to provide a proper mixture.

It is a further object of my invention to provide an improved simple mixing control means for a refrigerating system embodying both normal and reverse cycle refrigeration to provide both heating and cooling in any desired proportion.

Further objects and advantages of the present invention will be apparent from the following description, reference being had to the accompanying drawings, wherein a preferred embodiment is clearly shown.

In the drawings:

Fig. 5 is an end view of the reversible synchronous clock shown in Fig. 6, and

Fig. 6 is a diagrammatic illustration of another form of control means for the apparatus shown in Fig. 1.

In the form of my invention disclosed herein, there is provided a refrigerating system in which air to be conditioned is separately circulated in heat exchange relation with the evaporator in one duct and the condenser and compressor in another duct which air is mixed in proper proportions by a damper operated by a self-starting synchronous clock motor at a timed speed under the control of a thermostat located in the outlet which conducts the mixed air to an air blanket provided upon the bed which discharges the conditioned air through the fabric on to a person lying on the bed.

Figures 1, 2:
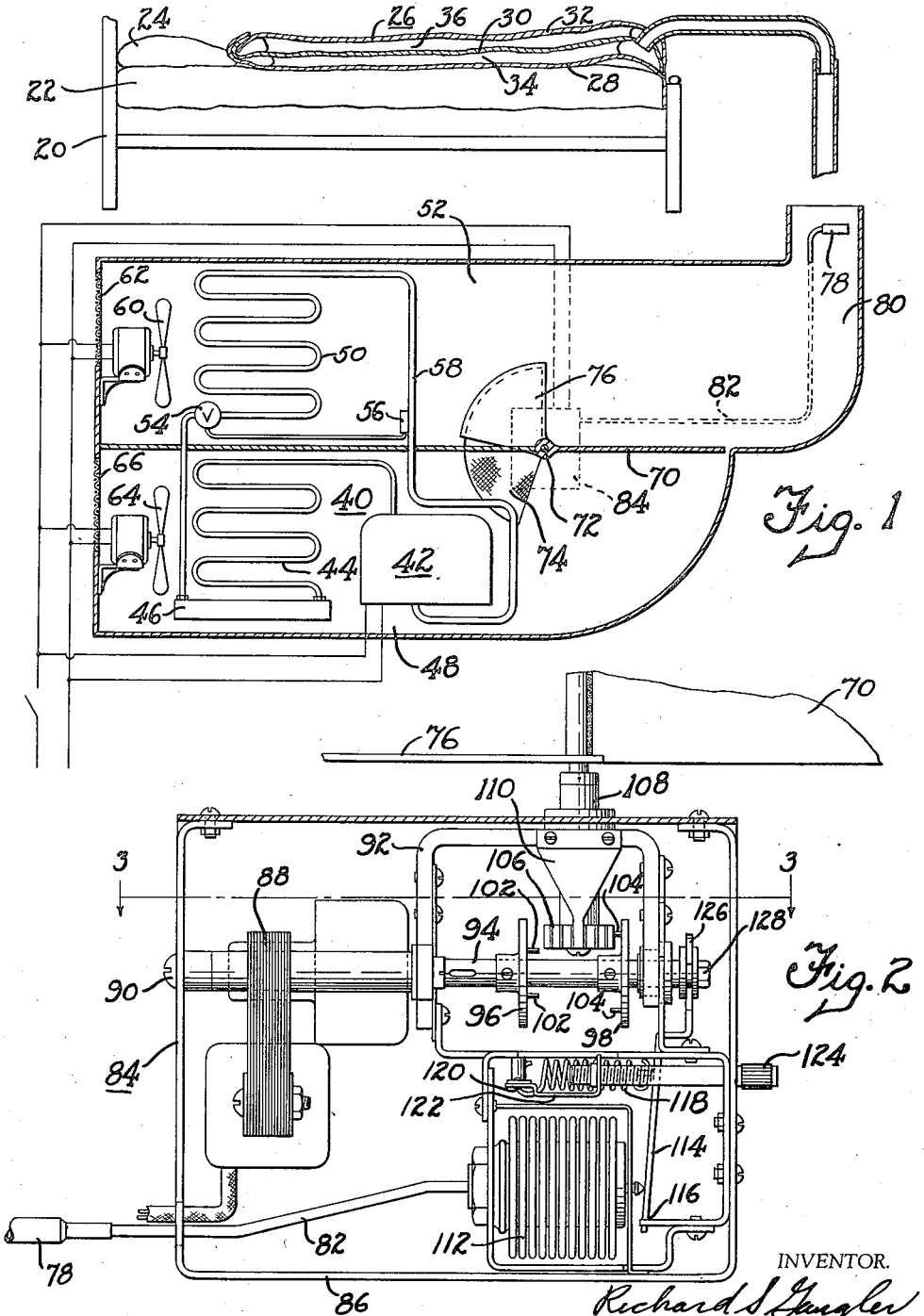
Fig. 1 is a diagrammatic illustration partly in section embodying an air conditioning apparatus for cooling a bed illustrating one form of my invention.
Fig. 2 is a view partly in section showing the control means of the apparatus disclosed in Fig. 1.

Referring now to the drawings and more particularly to Fig. 1, there is shown a bed 20 provided with a mattress 22, a pillow 24 and an air blanket 26 comprising a lower sheet 28, an intermediate sheet 30 and an upper sheet 32 which are held together at their edge portions and at intermediate portions to provide a lower enclosure 34 and an upper enclosure 36. This air blanket 26 operates by introducing air into the lower chamber 34 so that some of this air escapes through the lower fabric sheet 28 into direct contact with a person lying on the bed while a smaller portion escapes first through the intermediate sheet 30 into the upper enclosure 36 and thence through the upper sheet 32 beyond the fabric so that the chamber 36 is inflated and thus is made an insulating air space.

In order to supply air to the proper temperature to the space 34, I provide a refrigerating system including a refrigerant liquefying apparatus generally designated by the reference character 40 including a motor driven compressor 42 which compresses the refrigerant and forwards the compressed refrigerant to a condenser 44 where the compressed refrigerant is liquefied and collected in a receiver 46. This refrigerant liquefying apparatus is located within a duct means 48. Liquid refrigerant is supplied from the receiver 46 to an evaporating means 50 located within the duct means 52. This supply of liquid refrigerant is under the control of a thermostatic valve 54 which controls the flow of liquid refrigerant to the evaporating means 50 under the control of a thermostat 56 which is located in heat exchange relation to the return conduit 58. The liquid refrigerant in the evaporating means evaporates under reduced pressure and is returned to the compressor through the return conduit 58.

A motor driven fan 60 draws in air through the screened opening 62 in the duct means 52 and discharges this air over the surfaces of the evaporating means 50 to cool the air. Likewise, within the duct means 48 there is provided a second motor driven fan 64 which draws in air through the screened opening 66 and discharges the air over the surfaces of the refrigerant liquefying apparatus 40, especially the condenser 44 to warm the air. Thus, by this refrigerating system there is available a source of cold air and a source of warm air. The temperature of the air required by the blanket 26 is substantially a fixed amount, about 78 to 80° F. Temperature conditions do not greatly affect this requirement because of the insulating air space through which the air continually passes to prevent the infiltration of the room air or heat or cold according to the temperature of the room.

In order to supply this air at a substantially constant temperature, I provide a mixing damper 70 which is rotatably mounted upon the shaft 72. In Fig. 1 this damper is shown in a position in which all of the air which is being supplied to the air space 34 is that which comes from the duct means 52 containing the evaporating means 50 while the air from the duct means 48 is prevented from being conducted to the air space 34 by the damper 70. The air which is discharged over the surfaces of the liquefying apparatus is discharged through a screened opening 74 which is fan-shaped and which has one-half of its surface in a wall and the duct means 48 and the other half in the adjacent wall surface of the duct means 52. In order to prevent the discharge of air which is passed over the evaporating means through this portion of the fan-shaped screened opening 74, there is provided a sector shaped member 76 which extends from the lower portion of the damper 70 to cover the portion of the opening within the duct means 52.

The position of the damper 70 is controlled by a thermostat 78 located within the duct means 80 which connects the ducts 48 and 52 with the air space 34 of the blanket 26. This thermostat 78 is connected by tubing 82 with a control means 84 which rotates the damper 70 and its sector member 76 to the proper position in order to give the right proportion of warm and cold air to be supplied to the space 34 of the air blanket 26. The damper 70 and the sector member 76 are integral and move together. When the air supplied by the fan 60 and the evaporating means 50 becomes too cool the damper 70 and the sector member 76 are required to be moved a sufficient amount in a counter-clockwise direction to properly proportion the amount of warm and cool air which are mixed together to supply the air at a proper temperature to the air space 34.

If, however, this damper should be moved rapidly, then there would be the likelihood of the damper moving too far before the effect of the change in damper position would effect the thermostat 78. Also if the damper moved too slowly, then there would be a lag between the thermostatic control and the movement of the damper so that under changing conditions the blanket would not be supplied with air at the proper temperature. It is therefore necessary that the damper be moved at a controlled speed so that air at a substantially constant temperature is supplied to the inner blanket. In order to do this, I have provided a mechanism operated by a self-starting synchronous clock-motor and controlled by the thermostat for moving the damper 70 at a timed speed.

Figure 3:
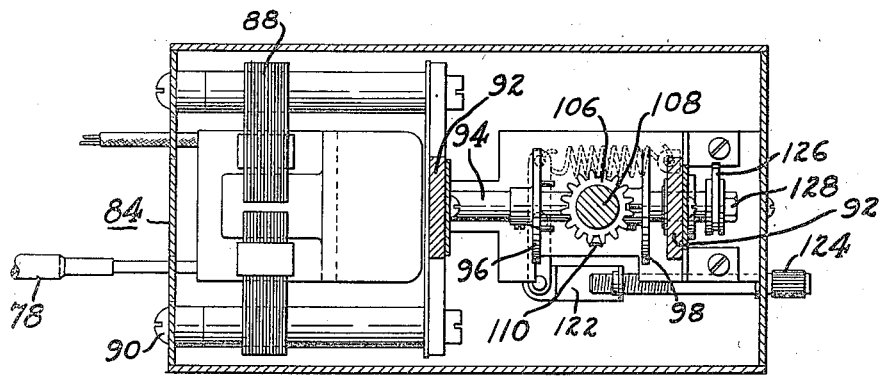
Fig. 3 is a sectional view taken along the line 3—3 of Fig. 2.

Referring now more particularly to Figs. 2 and 3 for a disclosure of one form of this apparatus, there is shown the control means 84 which comprises a metal enclosure 86 containing a self-starting synchronous clock motor 88 fastened to the wall structure 86 by a screw 90. At one side of the synchronous clock motor 88 there is provided a U-shaped frame 92 which supports a slidable rotatable shaft 94 which is coupled to the drive shaft of the synchronous clock motor which operates at a speed of 1 R. P. M. This shaft 94 is provided with a pair of spaced discs 96 and 98 which are each provided with inwardly projecting pins 102 and 104. Between these discs 96 and 98 there is provided a pinion 106 which is mounted on the lower end of the shaft 72 to which is fixed the damper 70 and the member 76. This shaft is journalled in a bearing 108 fastened to the U-shaped frame 92. The pinion 106 is provided with a spring pawl member 110 extending from the U-shaped frame 92 for imposing a friction to resist the movement of the damper under the pressure of the air. However, this amount of friction is not sufficient to prevent its operation by the clock means.

When the air flowing past the thermostat 78 is at the proper temperature, the damper 70 will remain stationary and the discs 96 and 98 will be substantially equally spaced from the pinion 106 so that the pins 102 and 104 are out of contact with the pinion 106. These discs 96 and 98 are continuously driven by the synchronous clock motor 88. The position of the discs is controlled by the thermostat 78 which is connected by the tubing 82 to a bellows 112 which operates a lever 114 pivoted at 116. The expansion of the bellows is controlled by a tension coil spring 118 which connects at one end to the lever 114 and at the other end to a cross lever 120 which has a threaded link 122 which receives a temperature regulating screw 124. This temperature regulating screw may be adjusted in order to adjust the tension of the spring 118, for controlling the temperatures at which the damper is moved to vary the temperature of the air supplied to the bed. The free end of the lever 114 is provided with a forked portion 126 which engages the end 128 of the shaft 94.

In operation the synchronous motor 88 is always in circuit and continuously rotates the shaft 94 and the discs 96 and 98 thereon. When the air passing in contact with the thermostat 78 is warm, the volatile liquid provided therein expands, thus causing the bellows 112 to expand, moving the lever 114 and the shaft 94 with its discs 96 and 98 to the right to cause the pins 102 to engage the pinion 106 to move the pinion and the damper 70 in a clockwise direction to supply more cool air. When, however, the air passing in contact with the thermostat 78 is too cool, the volatile liquid and the bellows 112 will collapse under the tension of the spring 118 to move the shaft 94 together with the discs 96 and 98 to the left to cause the pins 104 to engage the teeth of the pinion 106 in order to slowly move the damper 70 in a counter-clockwise direction in order to supply more warm air and less cold air to the blanket. The temperature regulating screw 124 may be turned to adjust the tension of the spring 118 so that air at different desired temperatures may be supplied to the air blanket. Thus in this form I have provided a simple mechanism comprising only one synchronous clock motor which will move the damper 70 and its segment member 76 at a timed speed according to the control of the thermostat 78 so as to supply air at a proper temperature to the blanket.

Figure 4:
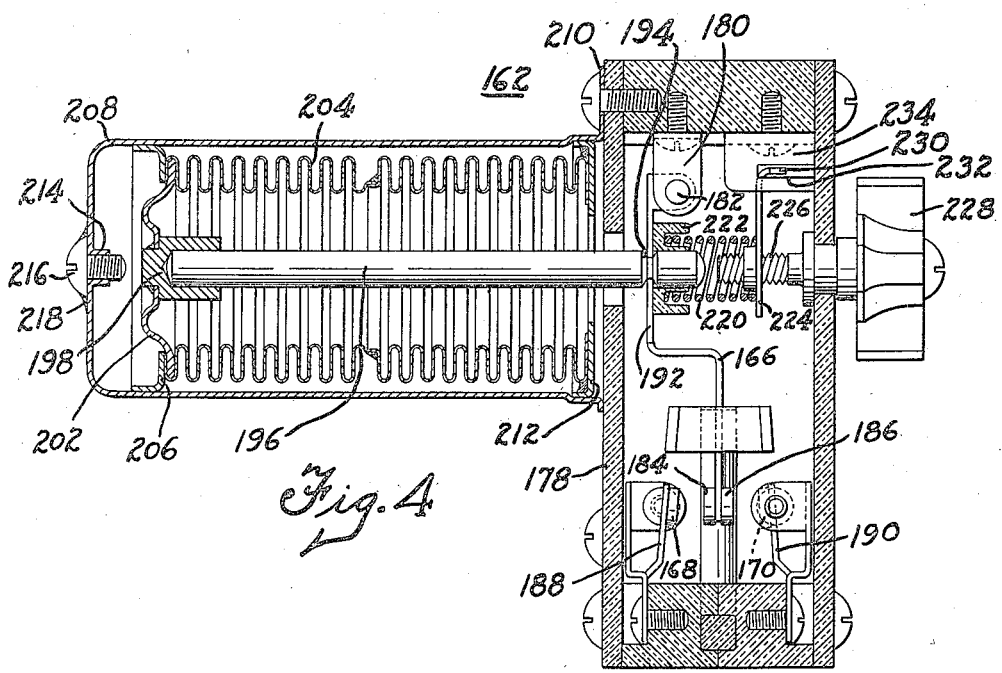
Fig. 4 is a sectional view of a thermostatic control switch shown diagrammatically in Fig. 6 for controlling a reversible synchronous motor in another form of control means for the apparatus shown in Fig. 1.

In Figs. 4, 5, and 6 I have shown another embodiment of my invention which includes two stators 150 and 152 of a self-starting synchronous clock motor which operate upon a double rotor 154 which is connected through the reduction gearing enclosed in a housing 156 to the shaft 158 upon which the damper 160 is mounted. This damper is like the damper 70 of Fig. 1 and similarly controls the mixing of the warm and cool air in the conditioning device. The two stators are adapted to operate the motor in opposite directions at a synchronous speed which is reduced in the reduction gearing to 1 R. P. M. at the shaft 158. The energization of the two stators is controlled by a thermostatic switch generally designated by the reference character 162. This thermostat switch has a thermostatically controlled bellows 164 which operates a contact carrying lever 166 which cooperates with the contacts 168 and 170 to conduct electric current from the conductor 172 either to the conductor 174 which connects to the stator 150 or to the conductor 176 which connects to the stator 152. The thermostatic bellows 164 is located within the discharge duct 80 of Fig. 1 so that it is responsive to the temperature of the air in the discharge duct, and according to the temperature of the discharge duct will when required energize either of the stators 150 or 152 in order to move the damper 160 at a timed speed to the required position to supply air at the proper temperature. The showing in Fig. 6 of the switch 162 is merely diagrammatic, the structural embodiment being shown in Fig. 4.

In this figure there is shown a built-up housing of an insulating material generally designated by the reference character 178 which contains a bracket 180 held by a screw extending into the wall structure of the housing. This bracket supports a pivot pin 182 upon which is mounted one end of the contact carrying lever 166 which carries at its opposite end the contacts 184 and 186 which cooperate with the spring mounted contacts 168 and 170 mounted on the free ends of the spring members 188 and 190 fastened to the housing 178 by screws. This lever is provided with a narrow slot 192 which receives a notched portion 194 of a rod 196 which extends within a bushing 198 fastened to the end plate 202 of the bellows 204. This end plate in its fully extended position engages an annular flange member 206 which is located within a deep cup-shaped member 208 provided at its inner end with a flange 210 connected to the housing 178 by screws. The inner end of the bellows 204 is connected to and sealed to a flange member 212 also located within the deep cup-shaped member 208. At the outer end of this deep cup-shaped member 208 there is provided a flanged threaded opening 214 through which the space within the cup-shaped member surrounding the bellows 204 and its end plate 202 is filled with a volatile liquid. After being properly filled or charged this opening is closed by a screw 216 which is soldered as shown at 218 in order to hermetically seal the cup-shaped member 208.

The bellows 204 and its end plate 202 operate against the tension of an adjustable compression spring 220 which bears against a spring retainer 222 which in turn bears against the face of the lever 166 in order to oppose and control the action of the bellows 204. The other end of the compression spring 220 is held by an adjustable spring retainer 224 threaded upon an adjusting screw 226 provided with a flange which engages the adjacent wall of the housing 178. This screw also has an outer portion which extends through an aperture in the housing and is provided with an adjusting knob 228 at its outer end. In order to prevent the rotation of the spring retainer 224 with the adjusting screw 226 there is provided an arm 230 which extends from the spring retainer 224 and engages a slot 232 in a bracket 234 provided on the wall of the housing 178 for preventing the rotation of this spring retainer.

By properly adjusting the screw 226 the action of the bellows 224 may be so controlled that the contacts 168 and 170 may be engaged at different desired temperature limits within the range of the device to control the stators 150 and 152 so as to provide air of different desired temperatures. This control likewise is simple and relatively inexpensive and moves the damper at a timed speed so as to secure a proper balance between the responsiveness of the thermostat and the movement of the damper.

Thus, by employing an inexpensive self-starting synchronous clock mechanism for operating a mixing damper under the control of a thermostat, I provide an inexpensive damper control mechanism in which the rate of movement of the damper is controlled so that it is coordinated with the responsiveness of the thermostat to eliminate "hunting" of the damper and to cause the damper to be moved at a timed speed directly to the correct position governed by the thermostat and stop when that point is reached.

While the form of embodiment of the present invention as herein disclosed constitutes a preferred form, it is to be understood that other forms might be adopted, all coming within the scope of the claims which follow.

What is claimed is as follows:

1. A temperature regulating means including a refrigerating system comprising liquefying means for dissipating heat and an evaporating means for absorbing heat, means operable coincidentally with said refrigerating system for circulating a fluid separately into heat exchange relation with said liquefying means and said evaporating means to provide heated and cooled fluid, a discharge duct means, a waste discharge, and mixing means for conducting any desired mixture of said heated and cooled fluid to said discharge duct and for conducting the remainder of the circulated fluid to said waste discharge to prevent the obstructing of the circulation of said fluid.

2. A temperature regulating means including a refrigerating system comprising liquefying means for dissipating heat and an evaporating means for absorbing heat, means operable coincidentally with said refrigerating system for circulating a fluid separately into heat exchange relation with said liquefying means and said evaporating means to provide heated and cooled fluid, a discharge duct means, a waste discharge, and mixing means responsive to the temperature of the fluid in said discharge duct for conducting any desired mixture of said heated and cooled fluid to said discharge duct and for conducting the remainder of the circulated fluid to said waste discharge to prevent the obstructing of the circulation of said fluid.

3. A temperature regulating means including a refrigerating system comprising liquefying means for dissipating heat and an evaporating means for absorbing heat, means operable coincidentally with said refrigerating system for circulating a fluid separately into heat exchange relation with said liquefying means and said evaporating means to provide heated and cooled fluid, a discharge duct means, a waste discharge, and fluid pressure controlled mixing means for conducting any desired mixture of said heated and cooled fluid to said discharge duct and for conducting the remainder of the circulated fluid to said waste discharge to prevent the obstructing of the circulation of said fluid.

4. A temperature regulating means including a refrigerating system comprising liquefying means for dissipating heat and an evaporating means for absorbing heat, means operable coincidentally with said refrigerating system for circulating a fluid separately into heat exchange relation with said liquefying means and said evaporating means to provide heated and cooled fluid, a discharge duct means, a waste discharge, and a single rotatable vane type mixing means for conducting any desired mixture of said heated and cooled fluid to said discharge duct and for conducting the remainder of the circulated fluid to said waste discharge to prevent the obstructing of the circulation of said fluid.

RICHARD S. GAUGLER.